UNITED STATES PATENT OFFICE.

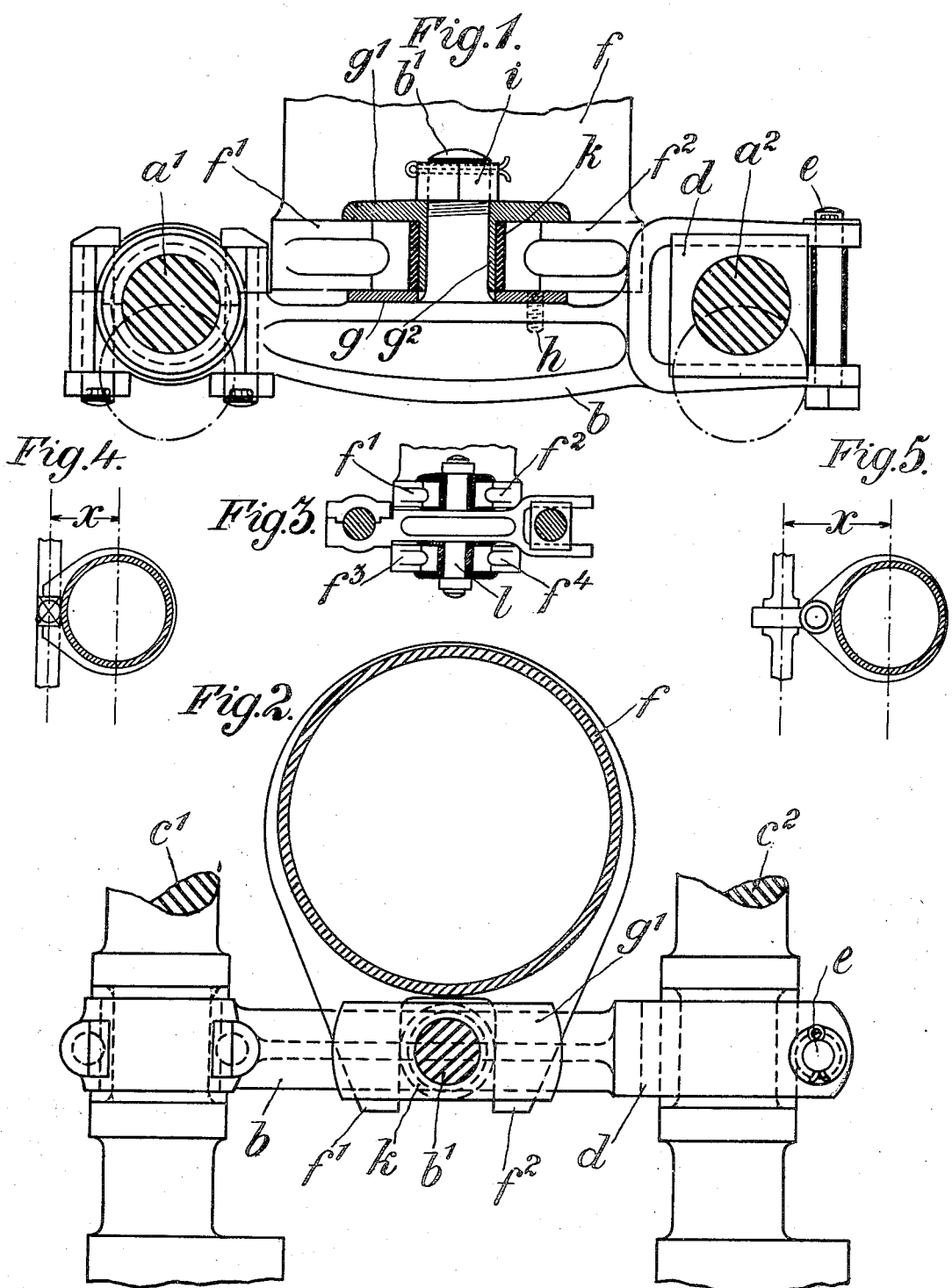

LÉON DUFOUR, OF GENEVA, SWITZERLAND.

VALVE-GEAR OF EXPLOSION-ENGINES.

1,132,247.　　　　　　Specification of Letters Patent.　　Patented Mar. 16, 1915.

Application filed October 29, 1913. Serial No. 797,943.

*To all whom it may concern:*

Be it known that I, LÉON DUFOUR, engineer, a citizen of Switzerland, residing at Geneva, Canton of Geneva, in the Confederation of Switzerland, have invented certain new and useful Improvements in Valve-Gears of Explosion-Engines, of which the following is a specification.

The present invention relates to a valve gear for explosion engines wherein a slide valve arranged in a known manner within each cylinder receives simultaneously a reciprocating movement along its axis and an oscillating movement around its axis by means of a cross beam moved parallel to itself by two crank shafts.

The object of this invention is to arrange parts such as to avoid any wedging and twisting in the working of said valve gear. In the usual distributing devices of this kind, the sleeve or slide valve which moves longitudinally and rotatively within the cylinder and within which the piston moves to and fro, receives its motion from the transverse beam which moves parallel to itself by means of a pin pivotally mounted on a projecting part of the inner end part of the sleeve or slide-valve, which pin is placed in a plane perpendicular to the axis of the cylinder and engages slidably in a corresponding recess of the cross beam. According to the present invention, on the contrary, the movements of the sleeve are produced by the action on protruding parts of the sleeve itself, of parts rigidly connected with the cross beam and one of which engages between two protruding parts of the sleeve and causes the rotative movements of the sleeve by its acting upon the sides of the said protruding parts, of the sleeve, whereas the longitudinal movements of the sleeve are caused by other parts rigidly connected with the cross beam and which act upon the upper and under faces of the protruding parts. Thus the parts which actuate the sleeve lie in a plane which is nearer to the cylinder axis than is the case with the usual devices, and consequently the wedging action exerted upon the sleeve is reduced. Heretofore this wedging action exerted upon the sleeve has been one of the main causes for limiting the efficiency of motors of the kind referred to and by the arrangement according to the present invention, a greatly improved operation of the sleeve or sleeves is obtained, which results in a material increase of the efficiency of the motor.

The protruding part of the cross beam engaging with the protruding parts of the sleeve may advantageously consist of one pin or more carried by the cross beam and the axis of which is placed parallel to the axis of the cylinder and the longitudinal movements of the sleeve in one or in both directions may advantageously be produced by the cross beam itself acting upon one or more corresponding faces of the protruding parts of the sleeve.

In the annexed drawings two forms of valve gears are shown given as examples.

Figure 1 is a sectional elevation and Fig. 2 a sectional plan of the one form and Fig. 3 a sectional elevation of the second form of valve gear. Figs. 4 and 5 show modifications.

$a^1$ and $a^2$ in Figs. 1 and 2 represent crank pins of two like cranks which impart a swinging movement to cross beam $b$; said cranks which are not represented in Fig. 1, are mounted fast on shafts $c^1$, $c^2$, driven both at the same speed from a motor by means of a gear of tooth wheels, of ring, chains or any other of the usual elements for transmitting power. One end of beam $b$ is shaped like a crosshead for a crank pin $a^1$ and the other end like a fork-like guide wherein is made to slide along the length axis of the beam a slide piece $d$ forming the bearing of a pin $a^2$, a bolt $e$ connecting the two ends of the fork.

On the upper side of beam $b$ and in the middle between the two crank pins a pin $b^1$ is cast on being embraced by a fork-like projection $f^1$, $f^2$ of a sleeve $f$ and transmitting thereby its movements to the sleeve, only one end of which is shown in the drawings. Fork $f^1$ $f^2$ is taken between two plates $g$ and $g^1$, the first of which is prevented from turning by a stud $h$ and the second is made in one piece with a sleeve $g^2$ surrounding the pin $b^1$, both plates kept together by a nut $i$ and another sleeve $k$ which surrounds the sleeve $g^2$ and freely turning thereon.

The cross beam $b$ transmits to the sleeve $f$ a vertical up and down movement, whereby, besides the friction, the weight of the sleeve has to be overcome and plate $g$ imparts to the fork $f^1$ $f^2$ an upward movement and plate $g^2$ a downward movement. Cross-beam $b$ however also transmits to the sleeve $f$ by means of pin $b^1$ a horizontal oscillating movement.

As shown by Figs. 4 and 5, the distance $x$ of the cross beam causing the movements of the sleeve to the axis of the cylinder is diminished when using the device according to the present invention, and therefore the wedging action exerted upon the sleeve is correspondingly diminished and an easy and exact movement of the sleeve and an improved operation of the machine is obtained, which results in an increase of the efficiency of the motor.

Instead of imparting the downward movement to sleeve $f$ by means of a plate, like plate $g^1$, and instead of having only one fork-like projection the downward movement may be transmitted by cross-beam $b$ itself by employing two fork-like projections of the sleeve, one $f^1$ $f^2$ being above and the other $f^3$ $f^4$ underneath said beam. In this construction both fork-like projections embrace the same pin $l$, while the cross beam $b$ is provided at its ends with plates and nuts as shown in Fig. 3. It would also suit the purpose of this invention if there was employed a fork-like projection of the sleeve with a pin on the upper side of the cross-beam and a thumb-like projection without a pin underneath said beam.

I claim as my invention:

1. In combination with a valve gear for internal combustion engines comprising a sleeve sliding within the cylinder and receiving a reciprocating movement in an axial direction and an oscillating movement around its axis from a cross beam moved parallel to itself by the cranks of two crank shafts driven at the same speed from a motor, a protruding part moving with the cross beam and engaging between two protruding parts of the sleeve to cause partial rotations of the same in opposite directions and the cross beam itself acting upon the said protruding parts of the sleeve to cause axial movement of the sleeve in one direction.

2. In combination with a valve gear for internal combustion engines comprising a sleeve sliding within the cylinder and receiving a reciprocating movement in an axial direction and an oscillating movement around its axis from a cross-beam moved parallel to itself by the cranks of two crank shafts driven at the same speed from a motor, a pin carried by the cross-beam and having its axis placed parallel to the axis of the cylinder, which pin engages between two protruding parts of the sleeve to cause partial rotations of the same in opposite directions, the protruding parts of the sleeve having faces which are resting upon corresponding faces carried by the cross beam to cause axial movement of the sleeve in one direction.

In testimony whereof I have affixed my signature in presence of two witnesses.

LÉON DUFOUR.

Witnesses:
G. IMER,
LOUIS H. MUNIER.